US012780050B2

(12) United States Patent
Takai et al.

(10) Patent No.: US 12,780,050 B2
(45) Date of Patent: Nov. 3, 2026

(54) VEHICLE WITH BATTERY PACK AND EXHAUST DUCT

(71) Applicant: HONDA MOTOR CO., LTD., Tokyo (JP)

(72) Inventors: Chiaki Takai, Tokyo (JP); Motoi Shioaku, Tokyo (JP); Daigo Komatsu, Tokyo (JP); Koki Nakajima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 305 days.

(21) Appl. No.: 18/590,236

(22) Filed: Feb. 28, 2024

(65) Prior Publication Data

US 2024/0308394 A1 Sep. 19, 2024

(30) Foreign Application Priority Data

Mar. 13, 2023 (JP) ................................ 2023-039073

(51) Int. Cl.
*B60N 2/06* (2006.01)
*B60H 1/00* (2006.01)
(Continued)

(52) U.S. Cl.
CPC ........... *B60N 2/06* (2013.01); *B60H 1/00278* (2013.01); *B60L 50/66* (2019.02); *B60N 3/042* (2013.01);
(Continued)

(58) Field of Classification Search
CPC .. B60K 11/06; B60K 1/04; B60K 2001/0416; B60K 2001/0433; B60K 2001/0438;
(Continued)

(56) References Cited

U.S. PATENT DOCUMENTS 6,315,069 B1 * 11/2001 Suba ................... H01M 10/625 180/68.5
6,662,891 B2 * 12/2003 Misu ..................... B60W 10/30 903/952

(Continued)

FOREIGN PATENT DOCUMENTS

JP 2014104891 A * 6/2014 .......... H01M 10/613
JP 2018-030447 A 3/2018
JP 2020083223 A * 6/2020

*Primary Examiner* — Laura Freedman

(74) *Attorney, Agent, or Firm* — Paratus Law Group, PLLC

(57) ABSTRACT

A vehicle includes: a floor panel; a seat rail attached to the floor panel; a movable member slidably engaged with the seat rail; a seat supported by the movable member; a battery pack; and an exhaust duct having an exhaust port, wherein the battery pack includes a battery cover covering a battery module, the seat includes a seating portion, an under-seat cover member is fixed to at least one of the movable member and the seat, and slides in the front-rear direction integrally with the movable member and the seat, a rear end of the under-seat cover member is positioned between a front end and a rear end of the battery cover, a front end portion of the under-seat cover member is bent downward; and a front end of the under-seat cover member is positioned in front of the exhaust port and below an upper end of the exhaust port.

5 Claims, 5 Drawing Sheets

(51) Int. Cl.
*B60L 50/60* (2019.01)
*B60N 3/04* (2006.01)
*B62D 25/20* (2006.01)

(52) U.S. Cl.
CPC ........ *B62D 25/20* (2013.01); *B60H 2001/003* (2013.01)

(58) Field of Classification Search
CPC .......... B60N 2/06; B60N 2/065; B60N 3/042; B60H 1/00278; B60H 2001/003; B60L 50/66; B62D 25/20
See application file for complete search history.

(56) References Cited

U.S. PATENT DOCUMENTS

| | | | | |
|---|---|---|---|---|
| 6,798,658 | B2 * | 9/2004 | Takedomi | B60K 1/04 361/679.01 |
| 7,004,274 | B2 * | 2/2006 | Shibasawa | H01M 50/202 296/37.16 |
| 7,051,825 | B2 * | 5/2006 | Masui | B60L 50/16 280/783 |
| 7,079,379 | B2 * | 7/2006 | Yamaguchi | B60L 15/007 180/68.5 |
| 7,396,075 | B2 * | 7/2008 | Ohkuma | B60N 2/36 297/15 |
| 7,654,351 | B2 * | 2/2010 | Koike | H01M 50/278 180/68.5 |
| 7,688,582 | B2 * | 3/2010 | Fukazu | H01M 10/643 180/68.5 |
| 7,771,865 | B2 * | 8/2010 | Takasaki | H01M 10/625 429/82 |
| 7,905,307 | B2 * | 3/2011 | Kubota | H01M 10/6566 180/68.1 |
| 8,440,338 | B2 * | 5/2013 | Sato | H01M 10/613 429/72 |
| 8,567,543 | B2 * | 10/2013 | Kubota | B60L 58/26 180/68.5 |
| 8,717,761 | B2 * | 5/2014 | Aoki | B60K 1/04 180/68.5 |
| 8,820,455 | B2 * | 9/2014 | Nitawaki | B60L 50/64 180/68.5 |
| 9,160,042 | B2 * | 10/2015 | Fujii | H01M 10/625 |
| 9,187,052 | B2 * | 11/2015 | Kimura | B60L 50/40 |
| 9,623,741 | B2 * | 4/2017 | Honda | B60K 1/04 |
| 9,966,640 | B2 * | 5/2018 | Kumagai | B60L 58/26 |
| 10,005,336 | B2 * | 6/2018 | Koyama | B60R 13/0237 |
| 10,074,880 | B2 * | 9/2018 | Hiranishi | H01M 10/647 |
| 10,118,459 | B2 * | 11/2018 | Yasuda | B60L 50/64 |
| 10,160,286 | B2 * | 12/2018 | Mori | B60H 1/143 |
| 10,388,923 | B2 * | 8/2019 | Takahashi | H01M 50/262 |
| 11,192,445 | B2 * | 12/2021 | Kano | B60K 1/04 |
| 11,569,544 | B2 * | 1/2023 | Okada | H01M 50/35 |
| 11,643,029 | B2 * | 5/2023 | Takei | B60R 16/0231 361/697 |
| 11,760,185 | B2 * | 9/2023 | Komatsu | B60L 58/26 454/144 |
| 11,791,509 | B2 * | 10/2023 | Komatsu | H01M 10/6563 429/120 |
| 11,955,617 | B2 * | 4/2024 | Kaneshima | H01M 10/625 |
| 11,990,596 | B2 * | 5/2024 | Kimura | H01M 10/625 |
| 12,132,221 | B2 * | 10/2024 | Yashiro | H01M 50/325 |
| 12,148,909 | B2 * | 11/2024 | Kano | B60K 11/06 |
| 12,168,384 | B2 * | 12/2024 | Yoshinaga | B60H 1/00028 |
| 12,288,892 | B2 * | 4/2025 | Komatsu | H01M 50/244 |
| 12,525,658 | B2 * | 1/2026 | Yang | H01M 10/425 |
| 2016/0294026 | A1 * | 10/2016 | Tsuchiya | H01M 10/625 |
| 2018/0056894 | A1 | 3/2018 | Tsumura et al. | |
| 2021/0273275 | A1 * | 9/2021 | Takahashi | H01M 10/613 |
| 2021/0291905 | A1 * | 9/2021 | Nakano | H01M 50/244 |
| 2022/0037718 | A1 * | 2/2022 | Kaneshima | H01M 10/613 |
| 2023/0318110 | A1 * | 10/2023 | Shinoda | B60K 1/04 429/82 |
| 2024/0308393 | A1 * | 9/2024 | Komatsu | B60R 13/0237 |

* cited by examiner

VEHICLE WITH BATTERY PACK AND EXHAUST DUCT

CROSS-REFERENCE TO RELATED APPLICATIONS

This application is based on and claims priority under 35 USC 119 from Japanese Patent Application No. 2023-039073 filed on Mar. 13, 2023, the entire content of which is incorporated herein by reference.

TECHNICAL FIELD

The present invention relates to a vehicle. The present invention particularly relates to a vehicle equipped with a battery pack.

BACKGROUND ART

In recent years, researches and developments have been conducted on an electric vehicle which contributes to improvement in energy efficiency in order to allow more people to have access to affordable, reliable, sustainable and advanced energy. The electric vehicle is equipped with a battery pack, and the electric vehicle can travel with power of a drive motor driven by electric power stored in the battery pack.

JP2018-30447A discloses a vehicle in which a battery pack is disposed behind a rear seat and an exhaust duct is disposed behind the battery pack. In the vehicle described in JP2018-30447A, air that is heated after cooling the battery pack is discharged from the exhaust duct to a rear side of the battery pack.

However, there is a problem that as in the vehicle described in JP2018-30447A, when the air that is heated after cooling the battery pack is discharged from the exhaust duct to the rear side of the rear seat, that is, to a luggage compartment, a temperature in the luggage compartment increases.

Especially, in the case of, for example, sedan-type vehicles where a passenger compartment and a luggage compartment at a rear side of the passenger compartment are separated, the luggage compartment is generally not air-conditioned, and thus the problem of the rising temperature inside the luggage compartment becomes noticeable.

One option for solving the problem of the rising temperature in the luggage compartment is considered to cool the battery pack and discharge the heated air into the passenger compartment.

SUMMARY OF INVENTION

However, when the battery pack is cooled and the heated air is discharged into the passenger compartment, the air discharged from the exhaust duct may make occupants feel uncomfortable.

The present invention provides a vehicle that can prevent discomfort caused to occupants due to air discharged from an exhaust duct. By extension, it contributes to improvement in energy efficiency.

According to the present invention, even when an occupant is seated on a seat, air discharged from an exhaust port of an exhaust duct can be discharged to a place where the occupant seated on the seat is unlikely to feel uncomfortable, so that it is possible to prevent the air discharged from the exhaust port of the exhaust duct from causing discomfort to the occupant.

DESCRIPTION OF EMBODIMENTS

Figure 1:
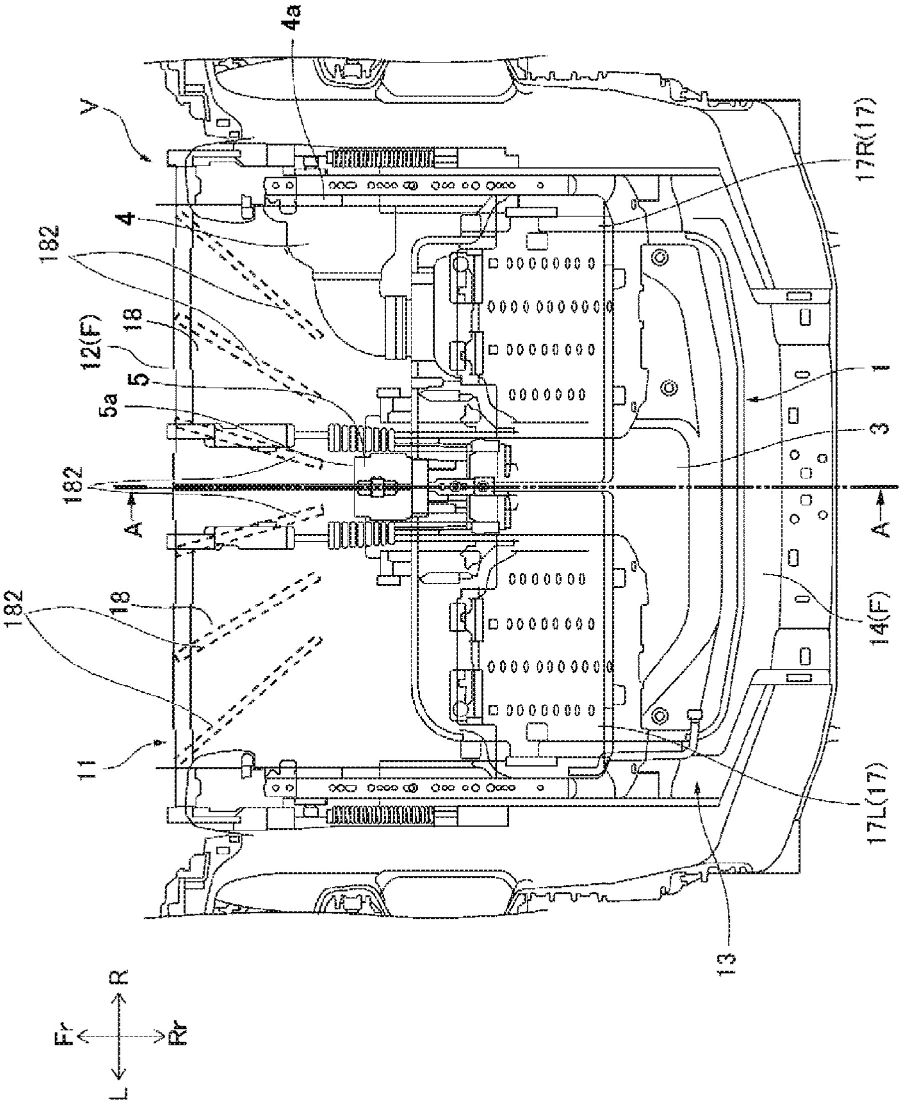
FIG. 1 is a plan view showing a rear portion of a passenger compartment and a luggage compartment of a vehicle according to an embodiment of the present invention.

Hereinafter, one embodiment of the present invention will be described with reference to the accompanying drawings. Note that the drawings are to be viewed in the direction of reference signs, and in the following description, front-rear, left-right, and upper-lower directions are referred to as directions seen from a driver, and in the drawings, a front side of the vehicle is shown as Fr, rear side as Rr, left side as L, right side as R, upper side as U, and lower side as D.

Vehicle

Figure 2:
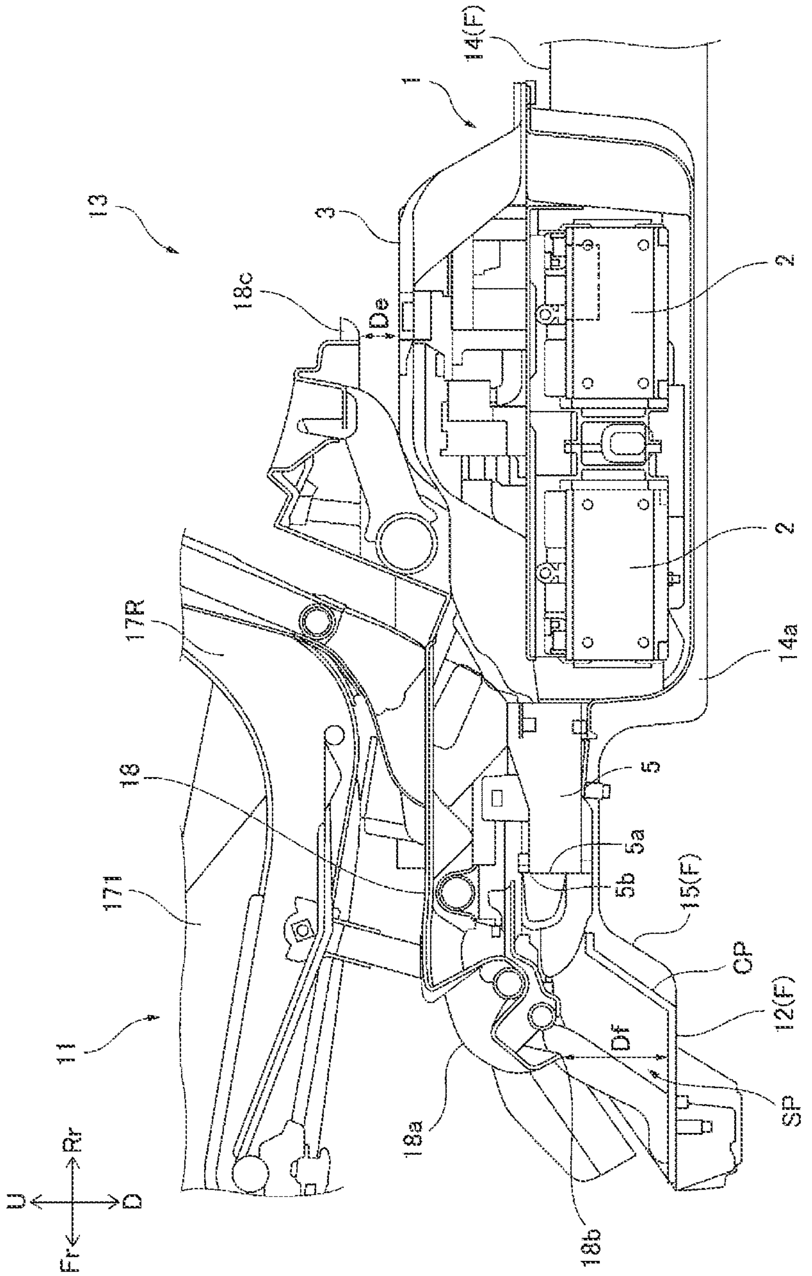
FIG. 2 is a cross-sectional view taken along a line A-A in FIG. 1.

As shown in FIGS. 1 and 2, a vehicle V of the present embodiment is, for example, a hybrid vehicle, and is equipped with a battery pack 1 accommodating a battery module 2.

A floor panel F of the vehicle V includes a front floor panel portion 12 constituting a floor portion of a passenger compartment 11, a rear floor panel portion 14 constituting a floor portion under a rear seat 17 and a floor portion of a luggage compartment 13 behind the passenger compartment 11, and a kick-up portion 15 which connects the front floor panel portion 12 and the rear floor panel portion 14 in a stepped manner.

A center tunnel (not shown) is formed in a center portion of the front floor panel portion 12 in a vehicle width direction along the front-rear direction. The center tunnel is bent such that the front floor panel portion 12 is upwardly convex, so that a trapezoidal tunnel space is formed therebelow. An exhaust pipe (not shown) for discharging exhaust gas from an internal combustion engine to a rear side of the vehicle V or the like is disposed in this tunnel space.

A floor carpet CP is laid on an upper surface of the front floor panel portion 12.

An accommodating recess 14*a* for accommodating the battery pack 1 is formed in the rear floor panel portion 14 below the luggage compartment 13, and the battery pack 1 is disposed in the accommodating recess 14*a*.

The battery pack 1 includes the battery module 2, a control device (not shown) such as a battery ECU, a cooling component (not shown) such as a cooling fan, and a battery cover 3. The battery cover 3 covers upper portions of the battery module 2, the control device, and the cooling component. Therefore, the battery module 2, the control device, and the cooling component are accommodated inside a space surrounded by the accommodating recess 14*a* and the battery cover 3.

An intake duct 4 for supplying air from the passenger compartment 11 to the battery pack 1 is attached near a right end portion of a front portion of the battery pack 1. An exhaust duct 5 for discharging air from the battery pack 1 to the passenger compartment 11 outside the battery pack 1 is attached to an approximately central part in the left-right direction of the front portion of the battery pack 1.

The intake duct 4 is attached near the right end portion of the front portion of the battery pack 1. The intake duct 4 extends forward from near the right end portion of the front portion of the battery pack 1 and is bent outward in the vehicle width direction (to the right side in the present embodiment). An intake port 4*a* facing outward in the vehicle width direction is provided at a right end bent outward in the vehicle width direction (to the right side in the present embodiment). The intake port 4*a* is an opening facing outward in the vehicle width direction.

The exhaust duct 5 extends forward from the approximately central part in the left-right direction of the front portion of the battery pack 1. A front end portion of the exhaust duct is provided with an exhaust port 5*a* positioned inside the passenger compartment 11 and facing forward.

The vehicle V includes the rear seat 17. The rear seat 17 is divided into left and right parts, and includes a left rear seat 17L and a right rear seat 17R. The battery pack 1 is disposed behind the rear seat 17.

Figure 3:
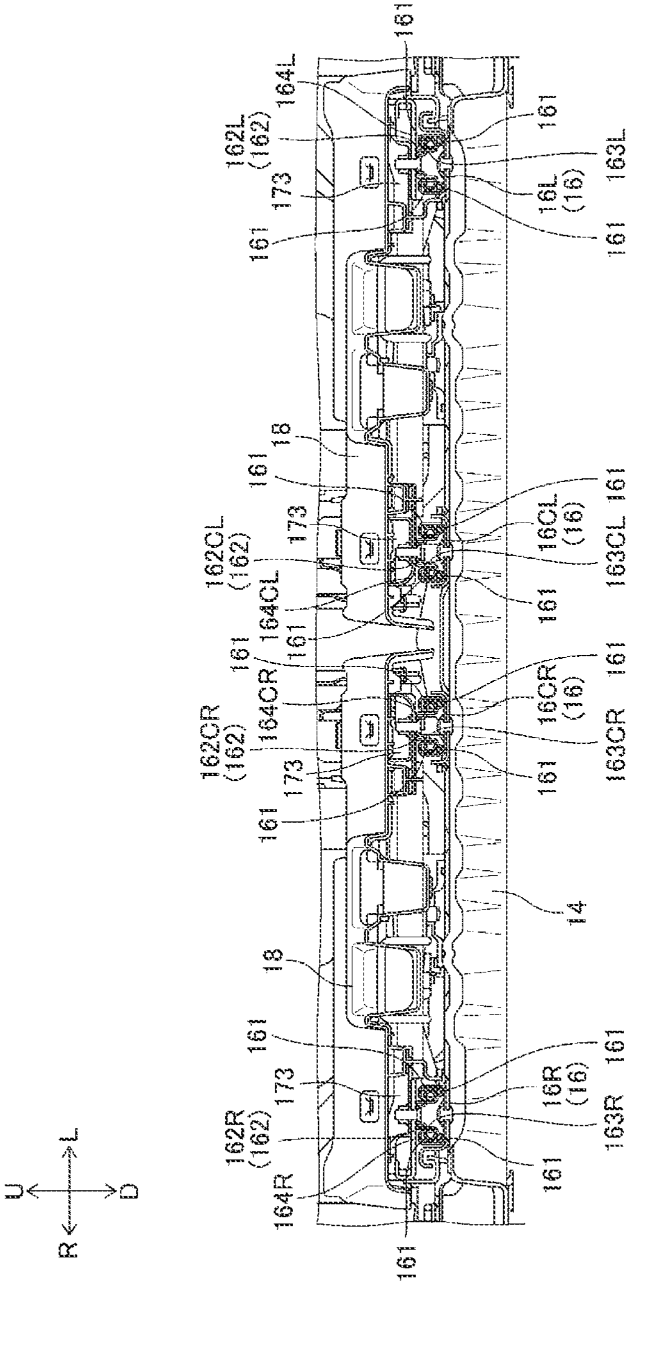
FIG. 3 is a cross-sectional view of a main part near a seat rail in FIG. 1.
Figure 4:
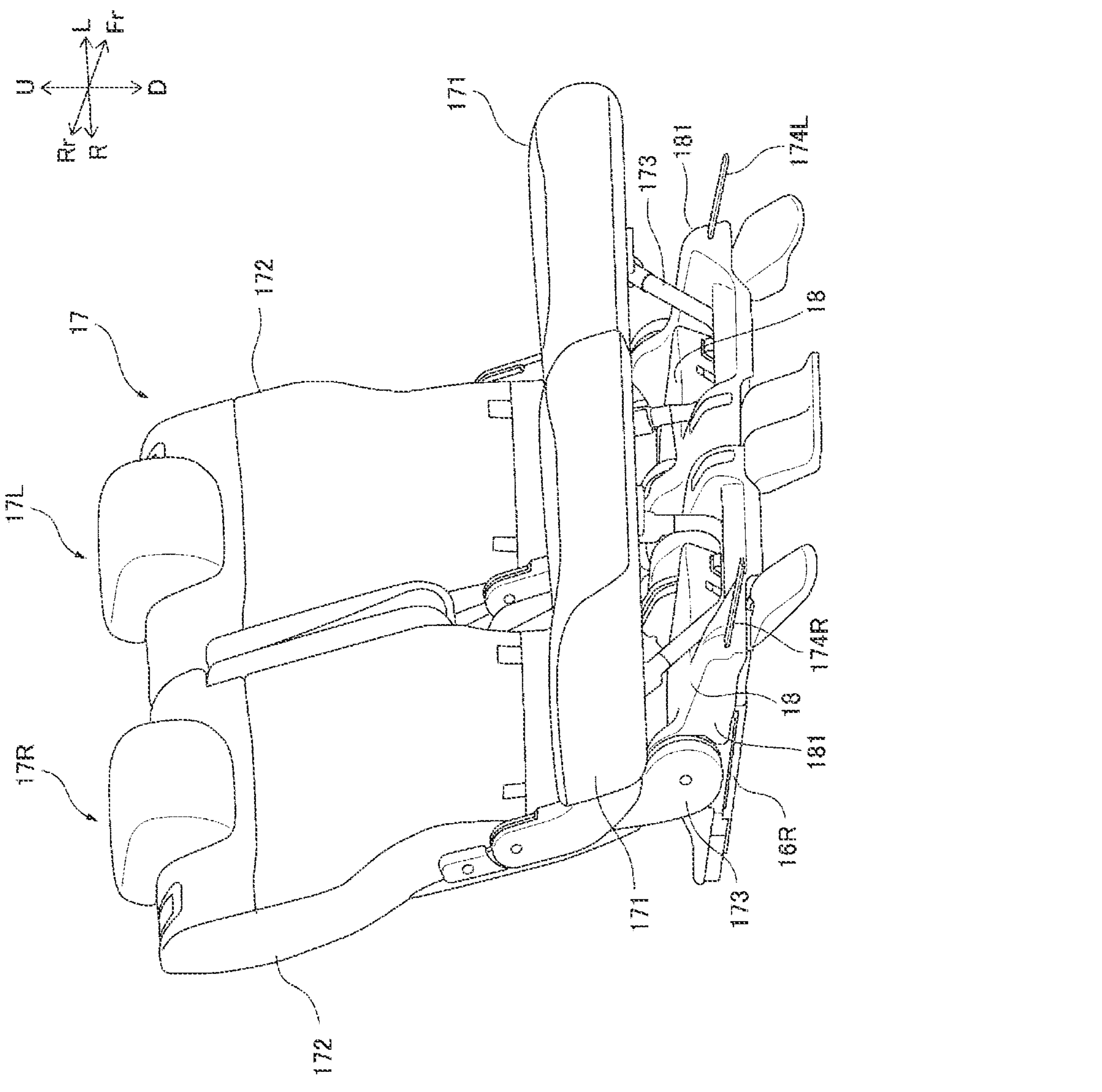
FIG. 4 is a perspective view of a main part near a rear seat and the seat rail.

As shown in FIGS. 3 and 4, a plurality of seat rails 16 extending in the front-rear direction are attached to an upper front portion of the rear floor panel portion 14. In the present embodiment, four seat rails 16 are attached side by side in the left-right direction. Specifically, the seat rail 16 includes a left seat rail 16L attached near a left end portion inside the passenger compartment 11, a right seat rail 16R attached near a right end portion inside the passenger compartment 11, a center left seat rail 16CL attached to a left side of an approximately central part in the left-right direction inside the passenger compartment 11, and a center right seat rail 16CR attached to a right side of the approximately central part in the left-right direction inside the passenger compartment 11.

Each seat rail 16 (left seat rail 16L, right seat rail 16R, center left seat rail 16CL, center right seat rail 16CR) has a substantially rectangular shape with an open upper portion when viewed from the front-rear direction. A plurality of rollers 161 are arranged at four corners of the upper, lower, left, and right sides of each seat rail 16, and are arranged in line at predetermined intervals in the front-rear direction. A movable member 162 is slidably engaged with each seat rail 16 in the front-rear direction. The movable members 162 include a left movable member 162L that engages with the left seat rail 16L, a right movable member 162R that engages with the right seat rail 16R, a center left movable member 162CL that engages with the center left seat rail 16CL, and a center right movable member 162CR that engages with the center right seat rail 16CR.

The left movable member 162L is slidably engaged with the left seat rail 16L in the front-rear direction. The left movable member 162L extends in the front-rear direction inside the left seat rail 16L, and includes a slide frame 163L that slides in the front-rear direction by the rollers 161 provided at four corners of the upper, lower, left, and right sides of the left seat rail 16L, and a support frame 164L extending from the slide frame 163L above the opening of the upper portion of the left seat rail 16L and extending in the front-rear direction.

The right movable member 162R is slidably engaged with the right seat rail 16R in the front-rear direction. The right movable member 162R extends in the front-rear direction inside the right seat rail 16R, and includes a slide frame 163R that slides in the front-rear direction by the rollers 161 provided at four corners of the upper, lower, left, and right sides of the right seat rail 16R, and a support frame 164R extending from the slide frame 163R above the opening of the upper portion of the right seat rail 16R and extending in the front-rear direction.

The center left movable member 162CL is slidably engaged with the center left seat rail 16CL in the front-rear direction. The center left movable member 162CL extends in the front-rear direction inside the center left seat rail 16CL, and includes a slide frame 163CL that slides in the front-rear direction by the rollers 161 provided at four corners of the upper, lower, left, and right sides of the center left seat rail 16CL, and a support frame 164CL extending from the slide frame 163CL above the opening of the upper portion of the center left seat rail 16CL and extending in the front-rear direction.

The center right movable member 162CR is slidably engaged with the center right seat rail 16CR in the front-rear direction. The center right movable member 162CR extends in the front-rear direction inside the center right seat rail 16CR, and includes a slide frame 163CR that slides in the front-rear direction by the rollers 161 provided at four corners of the upper, lower, left, and right sides of the center right seat rail 16CR, and a support frame 164CR extending from the slide frame 163CR above the opening of the upper portion of the center right seat rail 16CR and extending in the front-rear direction.

The left rear seat 17L and the right rear seat 17R extend in the front-rear direction and the left-right direction, and each include a seating portion 171 on which an occupant is seated, a backrest portion 172 positioned at a rear end portion of the seating portion 171, extending in the upper-lower direction and the left-right direction, and supporting a back of the occupant seated on the seating portion 171, and a seat frame 173 that supports the seating portion 171 and the backrest portion 172.

The seat frame 173 of the left rear seat 17L is connected to the left movable member 162L and the center left movable member 162CL. The seat frame 173 of the right rear seat 17R is connected to the right movable member 162R and the center right movable member 162CR.

In this way, the left rear seat 17L is supported by the left movable member 162L and the center left movable member 162CL. The right rear seat 17R is supported by the right movable member 162R and the center right movable member 162CR. Then, the left rear seat 17L is slidable in the front-rear direction along the left seat rail 16L and the center left seat rail 16CL together with the left movable member 162L and the center left movable member 162CL. The right rear seat 17R is slidable in the front-rear direction along the right seat rail 16R and the center right seat rail 16CR together with the right movable member 162R and the center right movable member 162CR.

A front strap 174L is attached to a front end of the left movable member 162L or a left front end of the seat frame 173 of the left rear seat 17L. A front strap 174R is attached to a front end of the right movable member 162R or a right front end of the seat frame 173 of the right rear seat 17R. Although not shown, a rear strap is attached to a rear end of the left rear seat 17L, and a rear strap is attached to a rear end of the right rear seat 17R. When sliding the left rear seat 17L and the right rear seat 17R forward, the front straps 174L and 174R may be pulled forward to slide the left rear seat 17L and the right rear seat 17R forward. When sliding the left rear seat 17L and the right rear seat 17R rearward, the rear straps may be pulled rearward to slide the left rear seat 17L and the right rear seat 17R rearward.

Under-seat cover members 18 extending in the front-rear direction and the left-right direction are arranged between the seat frame 173 and the seating portion 171 of the left rear seat 17L and between the seat frame 173 and the seating portion 171 of the right rear seat 17R. The left and right under-seat cover members 18 are fixed to the left rear seat 17L and the right rear seat 17R, respectively. Note that the left and right under-seat cover members 18 may be fixed to the left movable member 162L and the center left movable member 162CL, and the right movable member 162R and the center right movable member 162CR, respectively, or may be fixed to the left rear seat 17L, the left movable member 162L, and the center left movable member 162CL, and to the right rear seat 17R, the right movable member 162R, and the center right movable member 162CR, respectively. The left and right under-seat cover members 18 slide in the front-rear direction integrally with the left rear seat 17L and the right rear seat 17R.

The left and right under-seat cover members 18 cover the upper side of the rear floor panel portion 14 in the left-right direction from the left side of the left seat rail 16L to the right side of the right seat rail 16R.

Returning to FIG. 2, the under-seat cover members 18 extend in the front-rear direction and the left-right direction between the exhaust duct 5 and the seating portions 171 of the left and right rear seats 17.

A rear end of the under-seat cover member 18 is positioned between a front end and a rear end of the battery cover 3 in the front-rear direction.

A front end portion 18*a* of the under-seat cover member 18 is bent downward, and a front end 18*b* of the under-seat cover member 18 is positioned in front of the exhaust port 5*a* of the exhaust duct 5 and below an upper end 5*b* of the exhaust port 5*a* of the exhaust duct 5.

Therefore, the air discharged from the exhaust port 5*a* of the exhaust duct 5, whose temperature rises after cooling the battery pack 1, is discharged into the passenger compartment 11 along the front end portion 18*a* of the under-seat cover member 18 toward the front side and diagonally downward. Therefore, even when an occupant is seated on the rear seat 17, the air discharged from the exhaust port 5*a* of the exhaust duct 5 can be discharged to a position lower than ankles of the occupant seated on the rear seat 17. Since the occupant seated on the rear seat 17 usually wears footwear such as shoes, the occupant is unlikely to feel uncomfortable even if the air discharged from the exhaust port 5*a* of the exhaust duct 5 hits the occupant. In this way, even when an occupant is seated on the rear seat 17, the air discharged from the exhaust port 5*a* of the exhaust duct 5 can be discharged to a place where the occupant seated on the rear seat 17 is unlikely to feel uncomfortable, so that it is possible to prevent the air discharged from the exhaust port 5*a* of the exhaust duct 5 from causing discomfort to the occupant.

A gap SP is formed between the front end 18*b* of the under-seat cover member 18 and the floor carpet CP.

Therefore, the air discharged from the exhaust port 5*a* of the exhaust duct 5 is discharged into the passenger compartment 11 along the front end portion 18*a* of the under-seat cover member 18 toward the floor carpet CP. Accordingly, the air discharged from the exhaust port 5*a* of the exhaust duct 5 can be discharged to a place where the occupant seated on the rear seat 17 is less likely to feel uncomfortable, so that it is possible to further prevent the air discharged from the exhaust port 5*a* of the exhaust duct 5 from causing discomfort to the occupant.

Furthermore, a distance De in the upper-lower direction between the rear end 18*c* of the under-seat cover member 18 and the battery cover 3 is shorter than a distance Df in the upper-lower direction between the front end 18*b* of the under-seat cover member 18 and the floor carpet CP.

Therefore, air flow resistance is greater between the rear end 18*c* of the under-seat cover member 18 and the battery cover 3 than between the front end 18*b* of the under-seat cover member 18 and the floor carpet CP, and air is difficult to be discharged. Therefore, the air discharged from the exhaust port 5*a* of the exhaust duct 5 is easy to be discharged forward from between the front end 18*b* of the under-seat cover member 18 and the floor carpet CP to the outside of the under-seat cover member 18, and is difficult to be discharged rearward from between the rear end 18*c* of the under-seat cover member 18 and the battery cover 3 to the outside of the under-seat cover member 18. Accordingly, the air discharged from the exhaust port 5*a* of the exhaust duct 5 can be discharged into the passenger compartment 11 more reliably.

Returning to FIG. 4, vertical wall portions 181 that are bent downward and extend in the front-rear direction and the upper-lower direction are formed at a left end portion and a right end portion of the under-seat cover member 18.

Therefore, the left and right vertical wall portions 181 make it difficult for the air below the under-seat cover members 18 to be discharged to the outside of the under-seat cover member 18 from the left and right sides of the under-seat cover members 18. In this way, the air discharged from the exhaust port 5*a* of the exhaust duct 5 can be discharged forward and diagonally downward into the passenger compartment 11 along the front end portion 18*a* of the under-seat cover member 18 more reliably.

Figure 5:
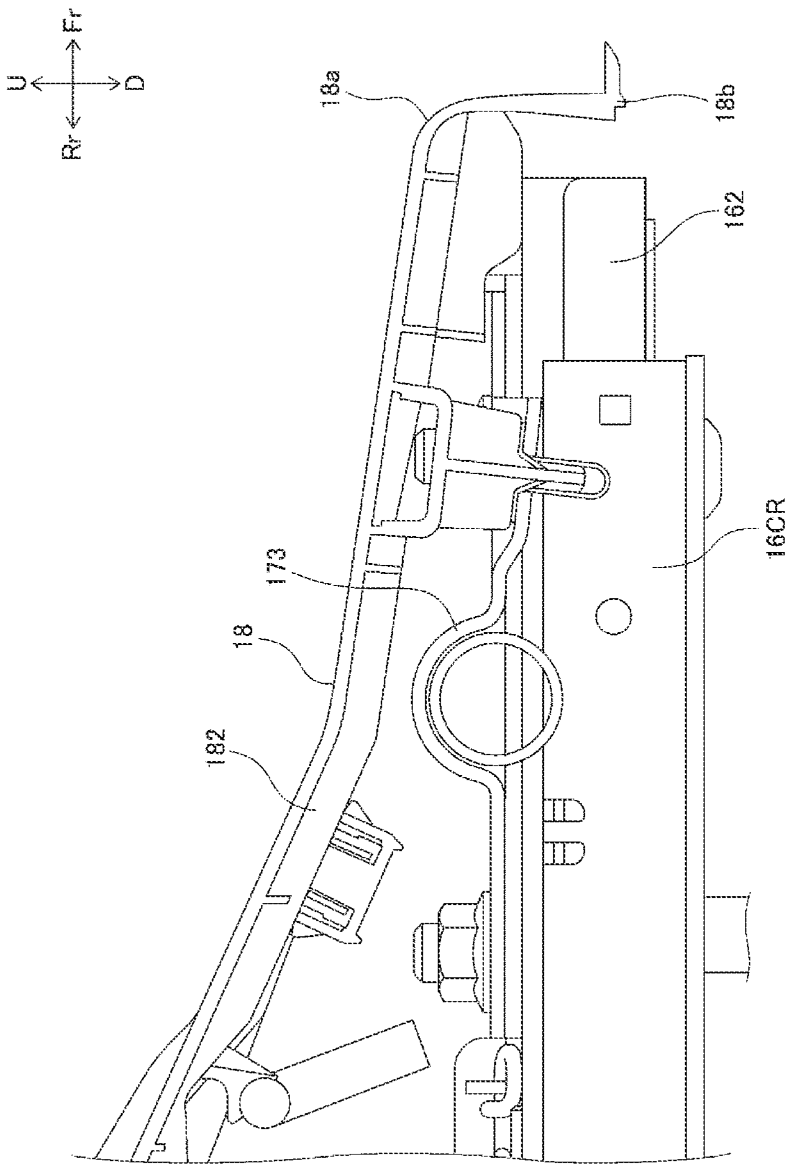
FIG. 5 is a cross-sectional view of a main part of an under-seat cover member.

As shown in FIGS. 1 and 5, the under-seat cover member 18 is provided with a plurality of rectifying walls 182 extending downward from a lower surface of the under-seat cover member 18 and radially extending forward from the exhaust port 5*a* of the exhaust duct when viewed from the upper-lower direction.

The air discharged from the exhaust port 5*a* of the exhaust duct 5 is likely to go straight through the exhaust port 5*a* and be discharged into the passenger compartment 11. By providing the plurality of rectifying walls 182 that extend radially forward from the exhaust port 5*a* of the exhaust duct 5, the air discharged from the exhaust port 5*a* of the exhaust duct 5 radially diffused in the left-right direction toward the front side along the rectifying walls 182, and is discharged into the passenger compartment 11. Accordingly, the air discharged from the exhaust port 5*a* of the exhaust duct 5, whose temperature rises after cooling the battery pack 1, can be diffused in the left-right direction and discharged to the passenger compartment 11, so that it is possible to further prevent the air discharged from the exhaust port 5*a* of the exhaust duct 5 from causing discomfort to the occupant.

Although an embodiment of the present invention has been described above with reference to the accompanying drawings, it is needless to say that the present invention is not limited to the embodiment. It is apparent that those skilled in the art can conceive of various modifications and alterations within the scope described in the claims, and it is understood that such modifications and alterations naturally fall within the technical scope of the present invention. In addition, respective constituent elements in the above embodiment may be freely combined without departing from the gist of the invention.

For example, the present invention is not limited to the rear seat 17, but may be a front seat.

For example, the support member that supports the rear seat 17 is not limited to the seat rail 16, but may be a member that supports the rear seat 17 in a manner of being not capable of sliding in the front-rear direction.

In the present description, at least the following matters are described. In the parentheses, the corresponding constituent elements and the like in the above embodiments are shown as an example, but the present invention is not limited thereto.

(1) A vehicle (vehicle V), including:

a floor panel (floor panel F) constituting a floor surface of a passenger compartment (passenger compartment 11) and a portion behind the passenger compartment;

a seat rail (seat rail 16) attached to the floor panel and extending in a front-rear direction;

a movable member (movable member 162) slidably engaged with the seat rail in the front-rear direction;

a seat (rear seat 17) supported by the movable member;

a battery pack (battery pack 1) disposed behind the seat; and an exhaust duct (exhaust duct 5) having an exhaust port (exhaust port 5*a*) facing forward and attached to a front portion of the battery pack for discharging air from the battery pack to outside of the battery pack, in which the battery pack includes a battery module (battery module 2) and a battery cover (battery cover 3) covering an upper portion of the battery module, the seat includes a seating portion (seating portion 171) extending in the front-rear direction and a left-right direction, an under-seat cover member (under-seat cover member 18) extending in the front-rear direction and the left-right direction is disposed between the exhaust duct and the seating portion, the under-seat cover member is fixed to at least one of the movable member and the seat, and slides in the front-rear direction integrally with the movable member and the seat, a rear end (rear end 18*c*) of the under-seat cover member is positioned between a front end and a rear end of the battery cover in the front-rear direction, a front end portion (front end portion 18*a*) of the under-seat cover member is bent downward; and a front end (front end 18*b*) of the under-seat cover member is positioned in front of the exhaust port of the exhaust duct and below an upper end (upper end 5*b*) of the exhaust port of the exhaust duct.

According to (1), even when an occupant is seated on a seat, air discharged from an exhaust port of an exhaust duct can be discharged to a place where the occupant seated on the seat is unlikely to feel uncomfortable, so that it is possible to prevent the air discharged from the exhaust port of the exhaust duct from causing discomfort to the occupant.

(2) The vehicle according to (1), in which a floor carpet (floor carpet CP) is laid on an upper surface of the floor panel, and a gap (gap SP) is formed between the front end of the under-seat cover member and the floor carpet.

According to (2), the air discharged from the exhaust port of the exhaust duct is discharged into the passenger compartment along the front end portion of the under-seat cover member toward the floor carpet. In this way, the air discharged from the exhaust port of the exhaust duct can be discharged to a place where the occupant seated on the seat is less likely to feel uncomfortable.

(3) The vehicle according to (2), in which a distance in an upper-lower direction (distance De in an upper-lower direction) between the rear end (rear end 18*c*) of the under-seat cover member and the battery cover is shorter than a distance in the upper-lower direction (distance Df in the upper-lower direction) between the front end of the under-seat cover member and the floor carpet.

According to (3), the air discharged from the exhaust port of the exhaust duct is easy to be discharged forward from between the front end of the under-seat cover member and the floor carpet to the outside of the under-seat cover member, and is difficult to be discharged rearward from between the rear end of the under-seat cover member and the battery cover to the outside of the under-seat cover member. Accordingly, the air discharged from the exhaust port of the exhaust duct can be discharged into the passenger compartment more reliably.

(4) The vehicle according to any one of (1) to (3), in which vertical wall portions (vertical wall portions 181) that are bent downward and extend in the front-rear direction and the upper-lower direction are formed at a left end portion and a right end portion of the under-seat cover member.

According to (4), the left and right vertical wall portions make it difficult for the air below the under-seat cover members to be discharged to the outside of the under-seat cover member from the left and right sides of the under-seat cover members. In this way, the air discharged from the exhaust port of the exhaust duct can be discharged forward and diagonally downward into the passenger compartment along the front end portion of the under-seat cover member more reliably.

(5) The vehicle according to any one of (1) to (3), in which the under-seat cover member is provided with a plurality of rectifying walls (rectifying walls 182) extending downward from a lower surface of the under-seat cover member and radially extending forward from the exhaust port of the exhaust duct when viewed from the upper-lower direction.

According to (5), the air discharged from the exhaust port of the exhaust duct is radially diffused in the left-right direction toward the front side along the rectifying walls and is discharged into the passenger compartment. Accordingly, the air discharged from the exhaust port of the exhaust duct, whose temperature rises after cooling the battery pack, can be diffused in the left-right direction and discharged to the passenger compartment, so that it is possible to further prevent the air discharged from the exhaust port of the exhaust duct from causing discomfort to the occupant.

What is claimed is:

1. A vehicle, comprising:

a floor panel constituting a floor surface of a passenger compartment and a portion behind the passenger compartment;

a seat rail attached to the floor panel and extending in a front-rear direction;

a movable member slidably engaged with the seat rail in the front-rear direction;

a seat supported by the movable member;

a battery pack disposed behind the seat; and an exhaust duct having an exhaust port facing forward and attached to a front portion of the battery pack for discharging air from the battery pack to outside of the battery pack, wherein the battery pack includes a battery module and a battery cover covering an upper portion of the battery module, the seat includes a seating portion extending in the front-rear direction and a left-right direction, an under-seat cover member extending in the front-rear direction and the left-right direction is disposed between the exhaust duct and the seating portion, the under-seat cover member is fixed to at least one of the movable member and the seat, and slides in the front-rear direction integrally with the movable member and the seat, a rear end of the under-seat cover member is positioned between a front end and a rear end of the battery cover in the front-rear direction, a front portion of the under-seat cover member is bent downward; and a front end of the under-seat cover member is positioned in front of the exhaust port of the exhaust duct and below an upper end of the exhaust port of the exhaust duct.

2. The vehicle according to claim 1, wherein a floor carpet is laid on an upper surface of the floor panel, and a gap is formed between the front end of the under-seat cover member and the floor carpet.

3. The vehicle according to claim 2, wherein a distance in an upper-lower direction between the rear end of the under-seat cover member and the battery cover is shorter than a distance in the upper-lower direction between the front end of the under-seat cover member and the floor carpet.

4. The vehicle according to claim 1, wherein vertical wall portions that are bent downward and extend in the front-rear direction and the upper-lower direction are formed at a left end portion and a right end portion of the under-seat cover member.

5. The vehicle according to claim 1, wherein the under-seat cover member is provided with a plurality of rectifying walls extending downward from a lower surface of the under-seat cover member and radially extending forward from the exhaust port of the exhaust duct when viewed from the upper-lower direction.

* * * * *